A. J. FREY.
SHEET METAL COMPRESSION CLAMP FOR TUBING AND THE LIKE.
APPLICATION FILED JUNE 30, 1916.
1,217,433.    Patented Feb. 27, 1917.
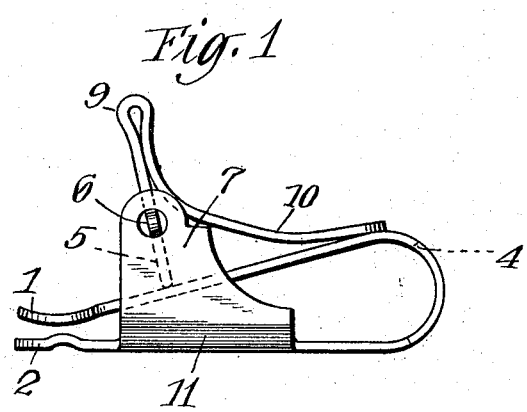
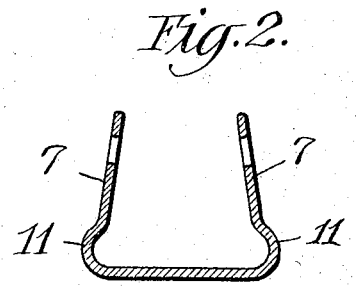
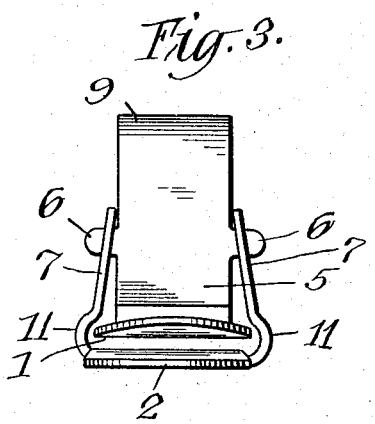
INVENTOR
August J. Frey
BY
ATTORNEYS.

UNITED STATES PATENT OFFICE.

AUGUST J. FREY, OF BROOKLYN, NEW YORK, ASSIGNOR TO BRASS GOODS M'F'G. CO., OF BROOKLYN, NEW YORK, A CORPORATION OF NEW YORK.

SHEET-METAL COMPRESSION-CLAMP FOR TUBING AND THE LIKE.

1,217,433.

Specification of Letters Patent.   Patented Feb. 27, 1917.

Application filed June 30, 1916.   Serial No. 106,772.

*To all whom it may concern:*

Be it known that I, AUGUST J. FREY, a citizen of the United States, and a resident of Brooklyn, in the county of Kings and State of New York, have invented certain new and useful Improvements in Sheet-Metal Compression-Clamps for Tubing and the like, of which the following is a specification.

My invention relates to the construction of compression clamps designed to apply clamping pressure to the object by means of an actuating device applied to one of the clamping jaws and comprising, in the usual construction of such clamps, a cam pivotally mounted in a pair of ears or brackets rising from a base upon which the object lies as for instance in a common construction of compression clamps for flexible tubing or other yielding object.

The object of my invention is to overcome the difficulty experienced in this class of devices when the same is used for clamping a thickness or size of material greater than that for which it is normally adapted, in which case there is liability that a part of the device will become set owing to the application of unnecessarily heavy pressure through the actuating device and will thereby become useless for again clamping the same thickness of material or for clamping smaller sizes or gages.

By means of my invention the same size of compression clamp may be used for bodies or objects of different size and will clamp either size perfectly and without injury to the device itself. Hence, when applied to compression devices employed for rubber tubing, the same device may be effectively used for both light and heavy wall tubing or for wall tubing of different external gages and without injury to the device itself.

Generally stated, my invention may be said to consist in so mounting the actuating device for the clamping jaws that it will be capable of yielding in the compressing operation so as to relieve the jaws themselves or other parts of the device from the abnormal pressure which is liable to occur in applying the compression when the device is used for clamping an object of large gage or thickness or one having abnormal resistance to compression.

In applying my invention to the usual construction of sheet metal compression clamp for rubber tubing, I mount the cam of the actuating device, as usual, in ears or brackets rising from the sheet metal base to either side of the tube but instead of making said ears rise in uniform vertical lines from the base, I so form or construct them that they shall be capable of yielding under the operation of the cam by the actuating arm and thus prevent the clamp member of the device from becoming set and useless.

In the accompanying drawings I show my invention as applied to a device of this general character, the same being shown in Figure 1 in side view for one form of tube compressing clamp.

Fig. 2 is a cross-section through the ears or brackets modified in a way to realize my invention.

Fig. 3 is an end elevation of the whole clamp.

Referring to the drawings, 1 and 2 indicate respectively the two clamp jaws of the device the lower one being a part of a piece of sheet metal bent around to form at its other end the upper clamping jaw. Said piece of sheet metal is provided with a perforation in its yoke portion as at 4 to allow the tube or other similar object to be passed through the clamp into position for clamping. The actuating device for the upper jaw is in this instance of the usual form and consists of the cam piece 5 having the pintles 6 by which it is mounted in the ears or brackets 7 in the usual manner. Said cam is shown as also provided with the usual operating arms 9, 10, two in number, to permit it to be operated by the thumb or finger to either close or open the jaws. Said cam and its operating arms are shown as made of a single piece of sheet metal bent to form but this construction forms no part of my invention and is merely shown for purposes of illustration.

The arm 10 is the arm by which the cam is usually operated to apply the pressure to the jaws and the object inserted between them and in the usual constructions of device it frequently happens that the spring arm carrying the jaw 1 will become set when unusual pressure is applied to the cam and the device will be rendered useless for future operations or for operation upon a smaller gage of tube or other object. To obviate this objection to the previous constructions, I propose to so construct or form the ears or brackets 7 that they shall be capable of yielding under the operation of the actuating devices when used to apply pressure by the cam and to this end I simply propose to form them as indicated at 11 with a swell preferably near the base and preferably extending outwardly from said base. The effect of this is to introduce a slight spring or yielding action under the strain applied vertically through the upright portions of the ears or brackets and thus relieve the clamp jaw arm of the abnormal pressure. The outward swell or bend is also of assistance in affording space for the reception of the expanding sides of large tubes when subjected to the clamping pressure, leaving the device, however, suitable for use with tubes or similar objects of smaller gage or size.

What I claim as my invention is:—

1. In a compression clamp of the character described, the combination of a base adapted to support the object to be clamped and provided at one end with a clamping jaw, an upper clamping jaw carried by an arm extending from the opposite end of the base over the object to be clamped, an actuating cam adapted to engage said arm and provided with horizontally extending pintles and a pair of cam supporting brackets rising from the base at opposite sides of the object to be clamped and having the pintles of the cam mounted therein at their upper ends, said brackets being formed to yield under the vertical strain of the cam when actuated to apply the clamping pressure.

2. In a compression clamp of the character described, the combination of a base, a pair of pivot carrying brackets rising from said base, each said bracket having a bend near its bottom, a pair of clamping jaws and a pivoted actuating cam mounted above the upper jaw by horizontally extending pintles engaging in said brackets.

3. In a compression clamp for tubing, the combination of a pair of clamping jaws formed from bent metal, one of said jaws being carried by a base and the other by an arm extending horizontally of the base over the object to be clamped, a pair of brackets rising from the base to either side of the object respectively and each having a bend to permit it to yield under vertical strain and a cam provided with a pair of horizontally extending pintles pivoted in said brackets and adapted to bear upon the arm carrying the upper jaw as and for the purpose described.

Signed at Brooklyn in the county of Kings and State of New York, this 27th day of June A. D. 1916.

AUGUST J. FREY.

Witnesses:
HAZEL BRILL,
ETHEL B. BRILL.

Copies of this patent may be obtained for five cents each, by addressing the "Commissioner of Patents, Washington, D. C."